United States Patent Office 2,724,003
Patented Nov. 15, 1955

2,724,003

PROCESS FOR PREPARING TRICHLOROBENZENE

Loyd W. Piester, New Martinsville, W. Va., assignor to Columbia-Southern Chemical Corporation, Allegheny County, Pa., a corporation of Delaware No Drawing. Application October 24, 1952,
Serial No. 316,799

3 Claims. (Cl. 260—650)

This invention is related to a method of converting benzene hexachloride to trichlorobenzene, and it is particularly concerned with the preparation of optimum yields of 1,2,4-trichlorobenzene by dehydrohalogenation of benzene hexachloride.

Conventional addition chlorination of benzene in the preparation of benzene hexachloride provides a product containing a mixture of at least five isomeric forms of benzene hexachloride. These have been designated alpha, beta, gamma, delta, and epsilon. Of these isomers, it is the gamma isomer which exhibits insecticidal properties, the other isomers having little or no utility as insecticides.

Since most of the known addition chlorination processes provide gamma isomer concentrations in the neighborhood of 12 to 16 per cent by weight of the total benzene hexachloride prepared, approximately 84 to 88 per cent of the product comprises undesirable isomers. It is, therefore, common to remove at least a portion of the undesirable isomers to provide a gamma-enriched product or to prepare an essentially pure gamma isomer product. Appropriate utilization of the undesirable isomers has been a difficult problem.

It has been suggested that benzene hexachloride, and particularly the insecticidally inactive isomers of benzene hexachloride, be converted to more useful products, i. e., to trichlorobenzene. This conversion is conveniently effected by dehydrohalogenation of benzene hexachloride. Such process results in the formation of three isomers of trichlorobenzene: 1,2,4-trichlorobenzene, 1,2,3-trichlorobenzene, and 1,3,5-trichlorobenzene. In general, the 1,2,4-trichlorobenzene constitutes from about 70 to 80 per cent, and in rare instances, 85 per cent by weight of the three isomers. Of these three isomers, 1,2,4-trichlorobenzene is of particular value in the preparation of 2,4,5-trichlorophenoxy acetic acid and its esters.

It is, therefore, distinctly advantageous to dehydrohalogenate benzene hexachloride in a manner such that an optimum amount of 1,2,4-trichlorobenzene is prepared. Moreover, separation of the three trichlorobenzene isomers is not readily accomplished, further accentuating the desirability of reducing the amounts of undesirable trichlorobenzene isomers.

According to this invention, it is possible to convert benzene hexachloride, and particularly the insecticidally inert isomers thereof, to a product containing at least 90 per cent and frequently as high as 95 per cent 1,2,4-trichlorobenzene by weight of the trichlorobenzene prepared. This invention, therefore, provides a feasible method for recovering substantial amounts of a valuable compound from heretofore waste materials.

This invention is performed by establishing a fluid reaction mixture containing benzene hexachloride and calcium hydroxide, notably an aqueous slurry of these two reactants, and maintaining the temperature of the reaction mixture at or above about 100° C., this temperature preferably being above the boiling point of the reaction mixture. In the preferred embodiment, a mixture of water and trichlorobenzene vapors is constantly removed from the reacting mass by distillation. A convenient technique for heating the reaction mass and performing this constant distillation is by addition of steam into the reaction zone. These vapors are condensed, separated by simple phase separation and treated appropriately to recover trichlorobenzene. Frequently, the aqueous phase is recycled to the reacting mass.

It has been found that the reaction temperature is a critical factor and that practice of this invention requires that the reaction be carried out such that the reaction mass is at least above about 100° C., and suitably the reacting mass is at its boiling temperature. The exact boiling temperature will vary depending on the degree to which the materials in the slurry elevate the boiling point of the mixture. At atmospheric pressure, this temperature is normally above about 100° C. If super atmospheric or sub-atmospheric pressures are employed, the temperature at which the reaction boils will be respectively higher or lower than at atmospheric pressure.

Maintaining the reaction mass at about at least 100° C. and/or above its boiling temperature, besides being critical in performing the reaction, has the added feature of facilitating processing of the product. As already explained, vapors of the trichlorobenzenes and water are constantly formed when the reaction mixture is boiling. Preferably, these vapors may be continually removed from the reaction zone as the reaction proceeds, condensed, and the resulting liquids separated to recover the trichlorobenzenes. This permits the trichlorobenzenes to be removed as they are formed and readily separated from the mass without subjecting the product to further heating.

The reaction requires two moles of benzene hexachloride and three moles of calcium hydroxide to form two moles of trichlorobenzene, and this process may be performed employing the reactants in substantially that ratio. It is to be understood, however, that the ratio of reactants may be varied without affecting the ultimate distribution of trichlorobenzene isomers.

Formation of a reaction mass of appropriate fluidity is accomplished by employing a liquid, notably water. Water in quantities sufficient to permit agitation of the mass by mechanical stirring is added to the benzene hexachloride and calcium hydroxide.

The reaction itself proceeds at a relatively slow rate, e. g., reaction periods of from 8 to 40 hours are often encountered at atmospheric pressure. Certain expedients may be employed to reduce these reaction periods and increase the yields per unit of time without adversely affecting the high 1,2,4-trichlorobenzene isomer concentrations. Increasing the temperature has been found to enhance the reaction rate. The reaction may be carried out under pressure, such as in an autoclave, to conveniently employ temperatures that are substantially higher than the atmospheric boiling temperature of the reaction mixture.

Further, the reaction may be performed in the presence of excess calcium hydroxide, that is, more calcium hydroxide is charged to the reaction zone than is theoretically required to react with the benzene hexachloride to form trichlorobenzene. Approximately, 50 per cent excess calcium hydroxide provides an optimum conversion rate. However, increased reaction rates are obtained with any excess from 1 to 130 per cent, or even higher of calcium hydroxide.

Another factor which affects the reaction rate is the degree to which the mass is agitated. For example, when two impellers instead of one impeller are employed to stir the same mass, yields of from 10 to 15 per cent higher for the same reaction period have been observed.

The particle size of the benzene hexachloride also apparently influences the rate of reaction. In general, the smaller the size of these particles, the more favorable the reaction rate. Preferably, particles having a mesh of 100 or higher may be employed to take advantage of this factor.

Another factor which affects the rate of reaction is the quality of the calcium hydroxide. Calcium hydroxide which is low in calcium carbonate and/or which has good dispersibility favors higher reaction rates.

While this invention is normally practiced with the waste isomers of benzene hexachloride, i. e., alpha, beta, delta, and epsilon, it is to be understood that the reaction takes place with any isomer or mixture of isomers. For practical reasons, a mixture of isomers which is predominantly alpha, e. g., 80–88 per cent alpha, 10 per cent beta and the remainder comprising small traces of the other three isomers, is requently used. Such isomeric mixture corresponds to the isomer distribution in the filter cake which is obtained when addition chlorination of benzene is continued until a reaction slurry containing a solid phase is obtained and filtered. This general separation is often employed in providing a gamma-enriched product.

The following example illustrates practice of this invention:

EXAMPLE I

A 1000-gallon, closed, steam-jacketed, steel reactor fitted with an agitator was provided with an overhead vapor take-off connected to a condenser. Typically, this reactor was charged with:

| | |
|---|---|
| Water | gallons 350 |
| Benzene hexachloride | pounds 1,500 |
| Calcium hydroxide | do 700 |

The average isomer analysis of this benzene hexachloride was:

| | Percent |
|---|---|
| Alpha | 86.2 |
| Beta | 10.2 |
| Gamma | 3.4 |
| Delta | 1.5 |
| Epsilon | 0.5 |

With the agitator operating to provide mixing of the reactants, the temperature of the mixture was maintained at the boiling temperature thereof by appropriate control of the steam in the jacket. Water and trichlorobenzene vapors were constantly distilled out of the reaction vapor via the overhead take-off. These vapors were condensed in the condenser and the resulting liquid mixture of water-trichlorobenzene was separated by permitting the organic and aqueous phases to settle and making a phase separation.

The organic phase, trichlorobenzene, was thereafter purified by atmospheric distillation and the isomer distribution determined by infra-red analysis. The aqueous phase was recycled to the reactor.

The results and specific operating conditions of a number of runs employing the described apparatus and procedure are listed in the following table:

*Table 1*

| Charge-Pounds— Benzene Hexachloride | Ca(OH)$_2$ | Reaction Temperature, °C. | Isomer Distribution— Percent of Trichlorobenzene | | |
|---|---|---|---|---|---|
| | | | 1, 2, 4 | 1, 2, 3 | 1, 3, 5 |
| 1,125 | 500 | 105 | 91.7 | 8.0 | 0.3 |
| 3,000 | 1,400 | 102 | 91.2 | 7.5 | 0.3 |
| 1,125 | 500 | 102 | 92.0 | 7.6 | 0.4 |
| 1,500 | 650 | 102 | 92.6 | 7.1 | 0.3 |
| 2,300 | 900 | 102 | 92.6 | 7.2 | 0.2 |
| 1,500 | 700 | 102 | 92.7 | 6.6 | 0.7 |
| 1,500 | 700 | 103 | 92.2 | 7.1 | 0.7 |
| 1,500 | 1,000 | 103 | 92.3 | 6.8 | 0.9 |
| 1,500 | 700 | 102 | 92.0 | 7.3 | 0.7 |

As can be seen from the above data, 1,2,4-trichlorobenzene comprising in excess of 91 per cent of all the isomers of trichlorobenzenes prepared by dehydrohalogenation of benzene hexachloride may be constantly attained when this invention is practiced.

Instead of employing a mixture of benzene hexachloride isomers, only one isomer may be employed with the same result. When the beta isomer per se was charged to the reactor, the reaction proceeded at a rate which is slower than when the other isomers are employed. Increasing the pressure and temperature enhances the reaction of the beta isomer. However, there is no change in isomer distribution of the trichlorobenzenes.

While the invention has heretofore been described with specific reference to charging calcium hydroxide to the reaction zone, it is to be recognized that calcium hydroxide may be formed in situ in the reaction zone by introducing appropriate reagents. Thus, calcium oxide may be employed along with water to provide calcium hydroxide. Other possibilities include reacting calcium chloride and sodium hydroxide in the reaction zone to form calcium hydroxide.

Although the present invention has been described with reference to the specific details of certain embodiments thereof, it is not intended that such details shall be regarded as limitations upon the scope of the invention, except insofar as included in the accompanying claims.

I claim:

1. A method of preparing trichlorobenzene having an enhanced 1,2,4-trichlorobenzene concentration by a dehydrochlorination reaction of benzene hexachloride with calcium hydroxide which comprises establishing an aqueous reaction mixture containing benzene hexachloride and calcium hydroxide and maintaining the temperature of the reaction mixture above at least about 100° C.

2. The method of preparing trichlorobenzene having an enhanced 1,2,4-trichlorobenzene concentration by a dehydrochlorination reaction of benzene hexachloride with calcium hydroxide which comprises establishing an aqueous reaction mixture containing benzene hexachloride and calcium hydroxide and maintaining the temperature of the reaction mixture at least as high as the boiling temperature of the mixture.

3. The method of claim 2 wherein the reaction is performed at superatmospheric pressure.

References Cited in the file of this patent

FOREIGN PATENTS 993,097 France _____ July 18, 1951

OTHER REFERENCES

Groggins: "Unit Processes in Organic Synthesis," third edition, pages 215–6 (1947).